United States Patent [19]
Lauritzen et al.

[11] Patent Number: 5,609,354
[45] Date of Patent: *Mar. 11, 1997

[54] CONTINUOUS CIRCUMFERENCE DIFFUSER REACTION CANISTER

[75] Inventors: Donald R. Lauritzen, Hyrum; Bradley W. Smith, Ogden, both of Utah

[73] Assignee: Morton International, Inc., Chicago, Ill.

[*] Notice: The term of this patent shall not extend beyond the expiration date of Pat. No. 5,407,227.

[21] Appl. No.: 574,171

[22] Filed: Dec. 18, 1995

Related U.S. Application Data

[63] Continuation of Ser. No. 272,407, Jul. 8, 1994, Pat. No. 5,480,182, which is a continuation of Ser. No. 123,824, Sep. 20, 1993, abandoned, which is a division of Ser. No. 840,238, Feb. 24, 1992, Pat. No. 5,332,256.

[51] Int. Cl.⁶ .................................................. B60R 21/20
[52] U.S. Cl. ........................................ 280/728.2; 280/736
[58] Field of Search ...................... 280/728.2, 732, 280/728.1, 728.3, 736, 740, 741, 743.1; 248/99, 101; 220/404

[56] References Cited

U.S. PATENT DOCUMENTS

| | | | |
|---|---|---|---|
| 4,136,894 | 1/1979 | Ono et al. | 280/740 |
| 4,721,317 | 1/1988 | Avot | 248/101 |
| 4,842,300 | 6/1989 | Ziomek et al. | 280/732 |
| 4,915,410 | 4/1990 | Bachelder | 280/728.2 |
| 4,941,678 | 7/1990 | Lauritzen et al. | 280/728.3 |
| 4,964,654 | 10/1990 | Bishop et al. | 280/728.2 |
| 5,058,919 | 10/1991 | Paquette et al. | 280/728.2 |
| 5,069,480 | 12/1991 | Good | 280/728.2 |
| 5,121,941 | 6/1992 | Mihm et al. | 280/728 |
| 5,129,674 | 7/1992 | Levosinski | 280/728.2 |
| 5,195,775 | 3/1993 | Komerska et al. | 280/728.2 |
| 5,209,519 | 5/1993 | Shiga et al. | 280/728.2 |
| 5,259,643 | 11/1993 | Kraft et al. | 280/740 |
| 5,261,693 | 11/1993 | Krickl et al. | 280/732 |
| 5,263,739 | 11/1993 | Webber et al. | 280/728.2 |
| 5,280,948 | 1/1994 | Henseler et al. | 280/728.2 |
| 5,332,256 | 7/1994 | Lauritzen et al. | 280/728.2 |
| 5,335,936 | 8/1994 | Faigle et al. | 280/728.2 |
| 5,344,182 | 9/1994 | Lauritzen et al. | 280/728.2 |
| 5,407,226 | 4/1995 | Lauritzen et al. | 280/732 |
| 5,407,227 | 4/1995 | Lauritzen et al. | 280/732 |
| 5,425,550 | 6/1995 | Paxton et al. | 280/728.2 |
| 5,454,586 | 10/1995 | Rogerson | 280/728.2 |
| 5,474,325 | 12/1995 | Daines et al. | 280/732 |
| 5,480,182 | 1/1996 | Lauritzen et al. | 280/728.2 |

FOREIGN PATENT DOCUMENTS

| | | | |
|---|---|---|---|
| 0447030 | 9/1991 | European Pat. Off. | 280/728.2 |
| 2151938 | 4/1973 | France . | |
| 2022194 | 12/1979 | United Kingdom | 280/740 |
| 94/25313 | 11/1994 | WIPO . | |

Primary Examiner—Brian L. Johnson
Assistant Examiner—Peter C. English
Attorney, Agent, or Firm—Nick C. Kottis; Gerald K. White

[57] ABSTRACT

A one piece reaction canister having a cover, a top panel and a bottom panel, a diffuser tube having a diffuser portion and a cap portion and formed in one piece with the top and bottom panels, end plates attached to the ends of the diffuser tube and the top and bottom panels, and a thrust neutral inflator supported by openings formed in the end plates, with the top and bottom panels extending in one piece to the cover from the diffuser and cap portions of the diffuser tube.

9 Claims, 10 Drawing Sheets

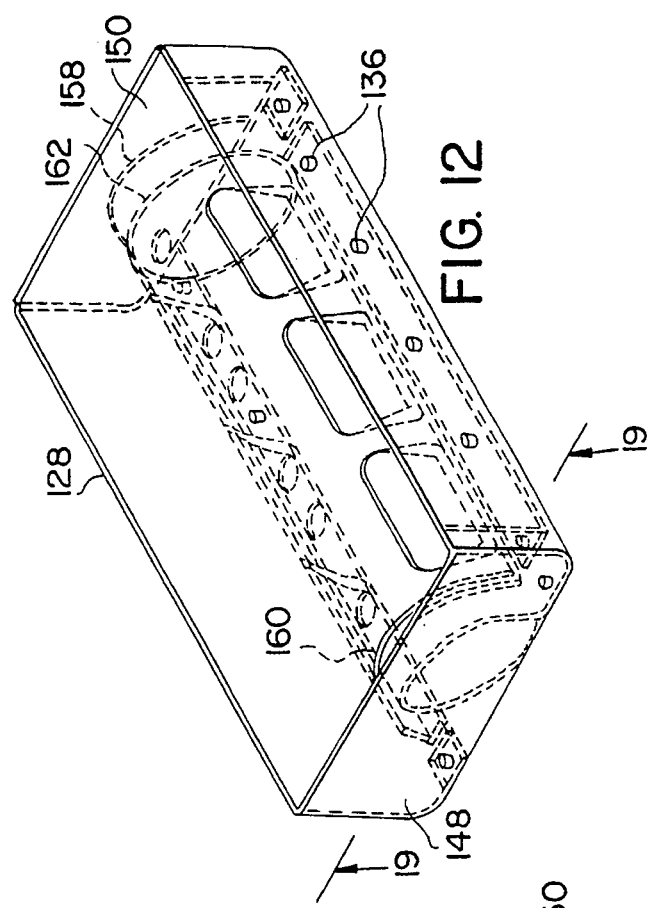
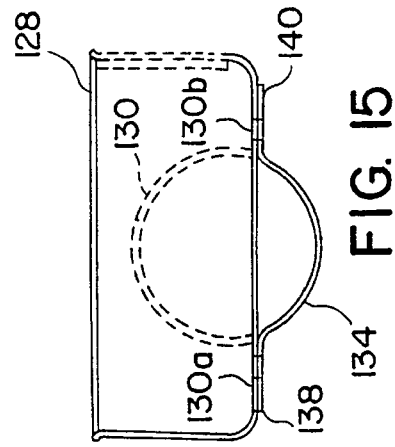
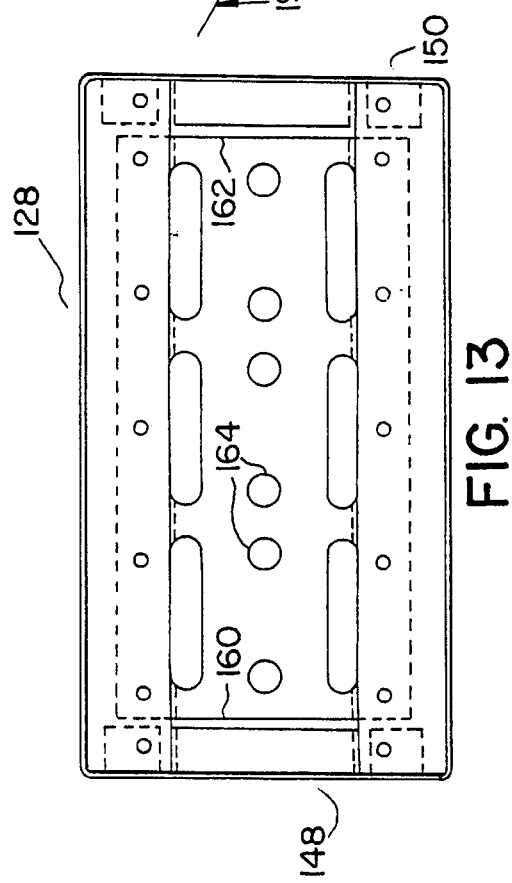
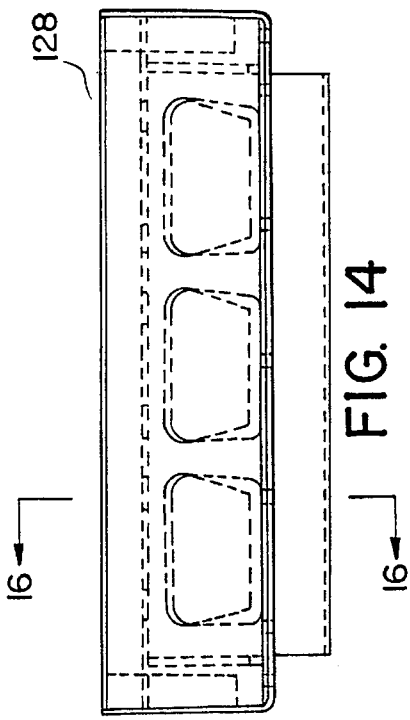

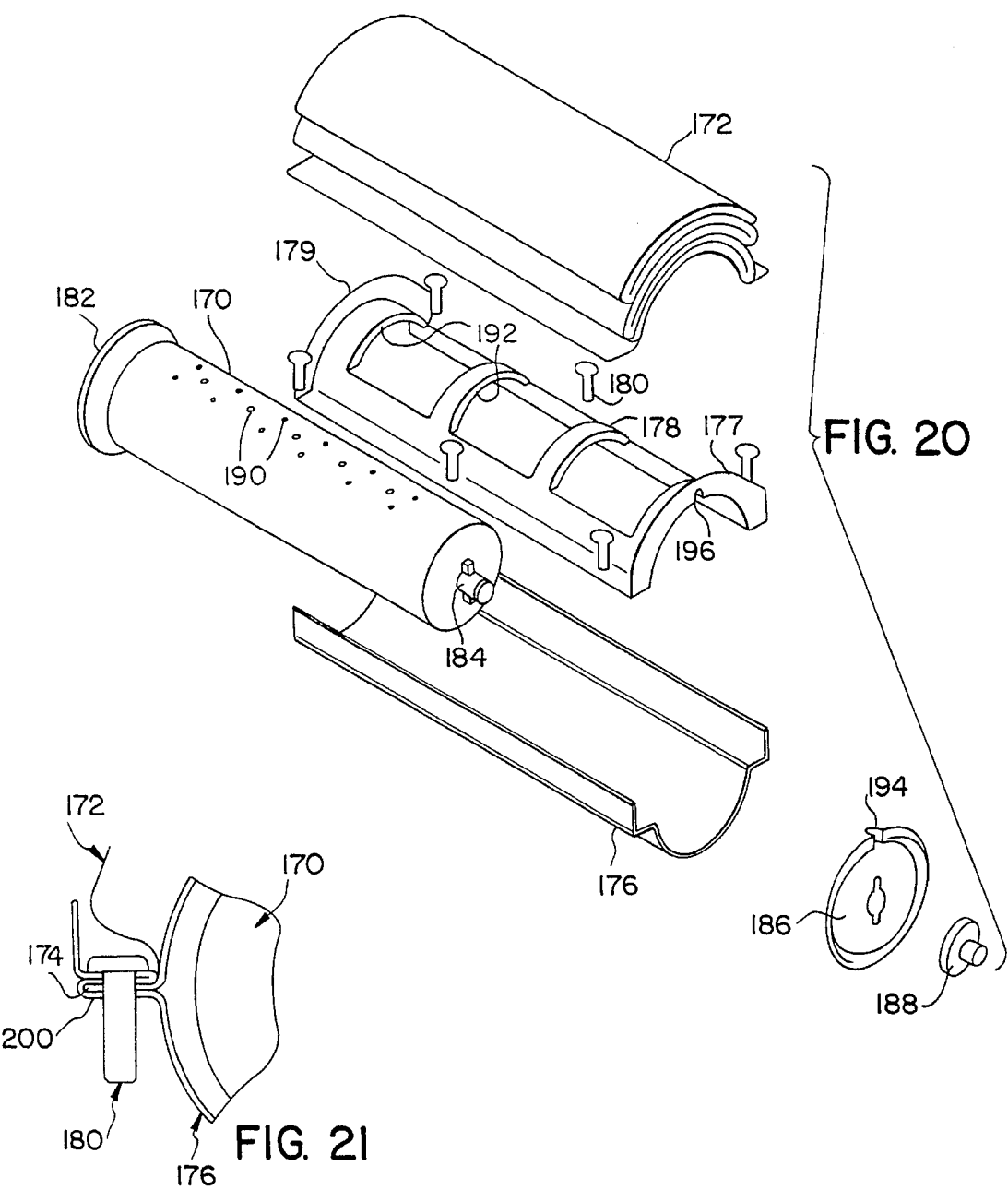

CONTINUOUS CIRCUMFERENCE DIFFUSER REACTION CANISTER

CROSS REFERENCE TO RELATED APPLICATIONS

This application is a continuation of application, U.S. Ser. No. 08/272,407 (2093-21-06), filed on Jul. 8, 1994, now U.S. Pat. No. 5,480,182, which in turn is a continuation of application U.S. Ser. No. 08/123,824 (2093-21-02), filed on Sep. 20, 1993, now abandoned, which in turn is a divisional of application U.S. Ser. No. 07/840,238 (2093-21-00), filed on Feb. 24, 1992, now U.S. Pat. No. 5,332,256.

BACKGROUND OF THE INVENTION

1. Field of the Invention

This invention relates to a passenger passive restraint air bag module, and more particularly, to an improvement therein designed to minimize deformation thereof and also possible damage to the dashboard or instrument panel of an automotive vehicle during deployment of the bag. The improvement is in the structure internal to the module for housing and positioning the gas generator or inflator and the air bag and for directing the inflating gas flow or jet for best deployment of the bag.

2. Description of the Prior Art

Some terminology herein is used for convenience in reference only and is not intended to be limiting. The words "forwardly" and "rearwardly" refer to the normal forward and reverse directions of travel of the vehicle to which a passenger passive restraint module is attached. The word "thrust neutral" refers to the production by an inflator of zero thrust when accidentally initiated as, for example, during shipping, storage or handling. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

The state of the prior art is indicated by the following U.S. patents:

| U.S. Pat. No. | Issue Date | Patentee |
|---|---|---|
| 3,414,292 | December 3, 1968 | S. Oldberg et al. |
| 3,715,131 | February 6, 1973 | E. K. Hurley et al. |
| 3,880,447 | April 29, 1975 | W. F. Thorn et al. |
| 4,332,398 | June 1, 1982 | G. R. Smith |
| 4,817,828 | April 4, 1989 | G. W. Goetz |
| 4,842,300 | June 27, 1989 | J. F. Ziomek et al. |
| 4,941,678 | July 17, 1990 | D. R. Lauritzen et al. |

The Oldberg et al. patent discloses a safety device for providing protection for vehicle passengers comprising a folded inflatable crash bag closely surrounding an elongated cylindrical diffuser member, being secured thereto by clamps. The diffuser member defines a chamber in which an inflator comprising a fluid reservoir in an inner container is concentrically located. For providing a tight seal the inner container is seam welded at the opposite ends thereof to the diffuser member. When activated by explosive means, fluid from the reservoir flows rearwardly from one side only of the inflator against an adjacent inner wall of the diffuser member. The flow divides and is discharged forwardly through a single row of longitudinally spaced apart openings, that are provided on one side only of the diffuser member, against a fixed baffle member. The baffle member divides and redirects the fluid rearwardly into the inflatable bag.

In the fabrication and assembly of inflatable devices for protecting vehicle passengers, the inflator poses the greatest potential hazard. Accidental initiation thereof during shipping, storing and installation in the safety device could result in injury to personnel and also cause property damage, particularly when the inflator is not of the thrust neutral type. Thus, in order to minimize the possibility of such injury and damage, it is desirable to reduce the amount of handling to which the inflator is subjected during the fabrication and assembly of the safety device. Installation of the inflator as a last operation in the assembly of the device would provide a substantial reduction in the risk of injury and damage. With the use of an inflator of the thrust neutral type, the risk of such injury and damage would be further reduced.

The construction of the Oldberg et al. safety device is such as to preclude installation of the inflator as a last operation of the assembly of the device. Specifically, the inflatable bag is provided in closely surrounding relation to the diffuser member, with the inflator, that is, the inner container, welded at the ends thereof to the diffuser member. Moreover, with fluid flowing from the reservoir of fluid from one side only of the inflator and from one side only of the diffuser member, neither the inflator alone, nor the inflator and diffuser member, as a unit, are thrust neutral.

The Hurley et al. patent discloses a folded inflatable bag surrounding a gas generator having a head assembly of cylindrical shape provided with a closed end and an open aft end that is closed by a closure plate. A centrally positioned orifice that is normally closed by a rupture disc is provided in the closure plate. Enclosing the cylindrical portion of the head assembly is a concentrically positioned diffuser having a closed end in the shape of a dished head, thereby providing an annular cavity about the gas generator. Upon initiation of the gas generator, the rupture disc releases, in response to pressure in the head assembly exceeding the burst pressure of the disc, thereby allowing the generated gas to flow out of the orifice in the closure plate of the aft end of the gas generator and to impinge on the inner wall at the end of the diffuser. This causes the gas to be dispersed into the annular cavity and out of a plurality of openings spaced around the wall of the diffuser. With the generated gas flowing out of the aft end of the gas generator, the operation thereof is not thrust neutral. Nor does the Hurley construction allow fabrication of the device with the installation of the gas generator as a last operation of the assembly.

The Thorn et al. patent discloses a folded inflatable bag positioned in close contact with an elongated cylindrical gas generator. The gas generator is provided with rows of gas outlet ports that extend 360° around the cylinder. The gas is discharged in opposing directions and produces counteracting thrusts, and thus, is thrust neutral. A gas redirecting plate in the shape of a half cylindrical container is positioned in spaced relation around the forwardly facing portion of the gas generator. The plate redirects forwardly discharged inflating gas in a rearward direction into the inflatable bag. Redirected gas together with gas that directly is discharged into the inflatable bag deploy the bag, which normally is folded, to an inflated condition. In the stored position thereof, the bag is positioned closely adjacent to and in contact with the rearward half side of the gas generator. This precludes installation of the gas generator as a last operation in the assembly of the apparatus.

The Smith patent discloses an inflatable restraint system including a folded inflatable cushion, a concentric elongated cylinder inflator-diffuser combination, and an elongated horizontally orientated nozzle. The inflator and diffuser are located within the confines of the folded cushion and are connected as a unit to the side walls of a housing therefor by means of bolts which extend into tapped bosses, which bosses are rigid with the combined unit. Consequently, neither the combined unit, nor the inflator can be installed as a last operation in the assembly of the system.

In the Goetz patent an elongated cylindrical inflator and a folded air bag are mounted in a rigid reaction canister which is fixed to the dashboard of a vehicle, with the orientation and arrangement of gas discharge openings or exhaust ports in the inflator being such that, when activated, an initial flow of generated gas is directed rearwardly by the inflator to inflate the bag. Excess gas flows from the inflator in a forward direction into the surrounding environment. This result is achieved by using rupturable foil layers to close both forwardly and rearwardly directed inflator exhaust ports, with rupturing of the rearwardly directed ports occurring at a pre-selected pressure that is lower than that at which the forwardly directed ports rupture. Thus, the inflator is not thrust neutral, nor is it capable of installation as a last operation of the assembly of the apparatus because of the positioning in the reaction canister of the folded air bag in close proximity to the inflator.

As disclosed in the Goetz patent and the other aforementioned prior art patents, it is known in prior art installations to provide a container to house the air bag and the inflator. The container is generally referred to as a reaction canister and provides a medium for installing and retaining a module in the instrument panel by the utilization of suitable brackets.

The reaction canister provides protection for the inflator, the diffuser, if provided, and the air bag until the time of deployment of the bag. Additionally, the reaction canister absorbs the loads that are produced upon deployment of the bag, which loads, typically, are large. Unless sufficiently absorbed, they can cause serious damage to the interior of the vehicle, and in particular, to the instrument panel.

A drawback to the use of a reaction canister in an air bag module for passenger protection is the envelope in the dashboard or instrument panel that is allotted for the installation of the module. Resulting restrictions, usually in height, causes lengthened, that is, deeper, top and bottom panels in order to accommodate the folded volume of the air bag. The bag is then restricted for unfolding and must travel rearwardly a distance greater than desirable before unfolding. Because of the large amount of gas that is produced and the distance the bag needs to travel before unfolding, pressure builds up in the reaction canister to a level that tends to expand the canister and cause it to bulge. This condition, known as bell mouthing, is very destructive of the instrument panel, and is particularly objectionable in low speed crashes where other damage to the vehicle is small.

The Ziomek et al. patent and the Lauritzen et al. patent disclose the use of a tether strap to resist the spreading forces on the reaction canister and thereby preclude bell mouthing upon deployment of the air bag. This technique allows the use of lighter weight and less expensive reaction canisters. The structural arrangement, however, leaves something to be desired in respect of the introduction of undesirable complication into the manufacturing and assembling operations, and moreover, does not allow installation of the inflator as a last operation in the assembly of the module.

Thus, there is a need and a demand for an improved reaction canister for use in an air bag module for the passenger side of a vehicle.

SUMMARY OF THE INVENTION

An object of the invention is to provide a reaction canister including a diffuser integral therewith for housing and positioning an inflator and an inflatable bag and for directing a gas jet produced by the inflator for inflating the bag.

Another object of the invention is to provide a reaction canister wherein the diffuser is a continuous circumference one piece diffuser.

Still another object of the invention is to provide such a reaction canister wherein the diffuser is of the clamshell type having two halves that are generally equal in configuration with mating flanges extending from each side of the halves.

A further object of the invention is to provide such a reaction canister wherein the diffuser is of a modified clamshell type wherein the flanges are moved forward and connect to the top and bottom chute panels.

Another object of the invention is to provide such a reaction canister which is so arranged as to permit installation of the inflator from the outside of the reaction canister thereby allowing installation of the inflator as a last operation of assembly.

Still another object of the invention is to provide such a reaction canister in which a thrust neutral inflator for safety may be used while retaining the advantage of being able to direct a gas jet that can be biased for best bag deployment.

In accomplishing these and other objectives of the invention, there is provided a reaction canister that features the assembly integrally therewith of a diffuser tube of continuous circumference. This type of diffuser tube provides a strong attachment means for the diffuser, indexing of the diffuser, containment of the generated gases of combustion at a lower gas pressure and provides a method of directing the gas for better bag deployment.

Other benefits derived from the use of a diffuser tube integral with the reaction canister are an easy method of sealing the gas generator or inflator against leakage into the passenger compartment, and a simpler inflator installation from the outside of the reaction canister thereby making the inflator installation a last operation of assembly. A thrust neutral inflator for safety may also be used while still retaining the advantage of being able to direct a gas jet that can be biased for best bag deployment. Still another benefit of the diffuser tube is a reduced, unsupported top and bottom panels depth that can help reduce the tendency to bellmouthing of the reaction canister.

The diffuser tube is a circumferential stress member wherein the majority of the stress from gas pressure can be taken out as tensile stress.

The reaction canister provides a vehicle for the incorporation or attachment of brackets for installation into the instrument panel of an automotive vehicle. The reaction canister also provides a secure reliable attachment for the inflatable bag.

The inflator is securely installed in the reaction canister. This installation is a unique feature of the present invention. The inflator utilized has an elongated cylindrical shape and incorporates a gas flow outlet or exhaust port arrangement that renders the inflator thrust neutral.

In accordance with one aspect of the present invention, the exhaust port arrangement of the inflator that is employed differs in an important and significant respect from that disclosed in the Thorn et al. patent in that the rows of gas outlet openings or exhaust ports do not extend 360° around the cylindrical inflator. Instead, several rows of exhaust ports parallel to the longitudinal axis of the inflator are provided on each side of the latter, with each row on one side being spaced 180° from a row on the other side.

In order to enable the use of the generated gas jet to direct the deployment of the inflatable bag while retaining the safety feature of thrust neutral for the gas generator, a diffuser tube has been incorporated as an integral part of the reaction canister. This diffuser tube, in effect, becomes a low pressure vessel with holes or slots for directing the gas jet.

In a first embodiment of the invention, a continuous circumference one piece diffuser tube having a diffuser portion and a cap portion and formed in one piece with the reaction canister is provided for containing the initial reaction canister pressure and for directing gas flow through breakout of the inflatable bag. Problems solved by the continuous circumference diffuser tube used according to the invention and benefits derived therefrom include the following:

1. The provision of structure to the body of the reaction canister, reducing the reacted surface area of the canister and thereby reducing the tendency to bell mouthing.

2. Containment of the gas flow impingement to these same surfaces, reducing the bell mouthing.

3. Providing a barrier between the inflator and the inflatable bag, thereby reducing the tendency to bag damage due to heat and eliminating bag and inflator interference at inflator installation.

4. Allowing the safety of using a thrust neutral inflator while still retaining the benefit of a directed flow for bag deployment without impingement of hot gases directly into the bag from the inflator.

In a second embodiment of the invention, the diffuser is in the form of a clamshell having two halves. Substantial retention of the benefits of the continuous circumference diffuser is achieved by keeping the fastening of the two halves as close to the radial shape as possible. In this respect, the continuous circumference and clamshell diffuser tubes are functionally the same. The clamshell diffuser, however, is more versatile.

Two types of clamshell diffuser tubes are disclosed. The first is the classic clamshell where the two halves are generally equal in configuration with mating flanges extending from each side of the halves. This arrangement works well with reaction canisters that have a long vertical dimension. With a long vertical dimension the reaction canister typically will have a shallow depth. This is the ideal configuration for low air bag breakout pressures and for reducing the tendency to reaction canister bell mouthing.

The second type of clamshell diffuser tube is a modified clamshell where the flanges are moved forward and connect to the top and bottom chute panels. This type of diffuser is particularly useful where the vertical dimension of the reaction canister is shorter. Generally a reaction canister with a small vertical dimension will have deeper chute panels. The forward location of the diffuser flanges and the attachment thereof to the top and bottom chute panels shorten the depths of these panels and reduce the tendency of the reaction canister to bell mouth. The modified clamshell diffuser provides a next to the top and bottom panel air bag installation, which leaves the flange area clear, where vent holes behind the bag in reaction canister venting where initial reaction canister pressure can be vented to reduce the pressure in the reaction canister until breakout of the inflatable bag.

The clamshell two halves provide the same circumferential benefits as described above for the continuous circumferential diffuser described hereinbefore after the two halves are fastened together. This fastening can be accomplished using any of the commonly accepted fastening methods now in use depending upon the circumstances of the reaction canister assembly, that is, welding, riveting, screws, bolts, etc.

The flanges provide a method of bag attachment by using the two half fasteners to secure the bag. The flanges and fasteners provide a chute attachment where chutes of different metals or plastics may be used. These same flanges become a strong structural area at the source of the loading, the inflator, where reaction canister installation bracketing may be attached.

By way of illustration and not limitation, it is noted that the clamshell feature is especially adapted for use in reaction canisters where the vertical height is four and one-half inches (4½") or 11.43 centimeters. Where the height is less, a modified clamshell is provided. In this modified clamshell, the flanges are angled or moved forward to reduce the height dimension. This configuration has been used in reaction canisters with a height of three inches (3") or 7.62 cm. An advantage of the forward flange location is that tying the flanges to the top and bottom panels reduces the length of the panels and thus reduces the area to be acted upon and consequently the tendency for the reaction canister to bell mouth.

In another modification, the clamshell concept is utilized in an assembly called a soft pack where the inflator and the inflatable bag are assembled to the diffuser in a normal manner and the bag is folded to the diffuser without a chute. The soft pack is intended for use where the reaction canister is built into the instrument panel by the manufacturer of the vehicle. The pack contains the inflator, bag and diffuser with studs for mounting in the instrument panel.

Continuous circumference and clamshell diffusers may be made of aluminum and steel and in combination. Similar configurations can be produced in extruded aluminum. There are limitations in the use of extruded aluminum in that the shape must be continuous over the entire length of the section. The chute top and bottom panels must be continuous with either the diffuser half or the cap half to be practical. Also, any features normal to the section surfaces must be second operation fabrication such as drilling, milling or punching.

All of the above arrangements may be duplicated in extruded aluminum or magnesium and in some instances cast in these same metals. Extruding presents some constraints in that one of the diffuser tube halves is required to be included in the top and bottom panels of the chute. The cap half is the logical half for this inclusion, leaving the diffuser half, being the smaller, left for second fabrication operations and/or different material applications.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference to the accompanying drawings which form part of the specification, of which:

FIG. 12 is a perspective illustration of the envelope configuration of a diffuser tube cap with wide mouth clamshell reaction canister wherein the length of the reaction canister is greater than that of the inflator;

FIG. 13 is a top plan view of the diffuser tube and reaction canister of FIG. 12;

FIG. 14 is a side view of the diffuser tube and reaction canister of FIG. 12;

FIG. 15 is an end view of the diffuser tube and reaction canister of FIG. 12;

FIG. 20 is an exploded view illustrating a soft pack assembly containing the inflator, inflatable bag and clamshell diffuser tube, with studs for mounting the reaction canister in the instrument panel of a vehicle;

FIG. 21 is a fragmented view illustrating the bag installation in the soft pack of FIG. 20;

DESCRIPTION OF THE PREFERRED EMBODIMENTS

Figure 1:
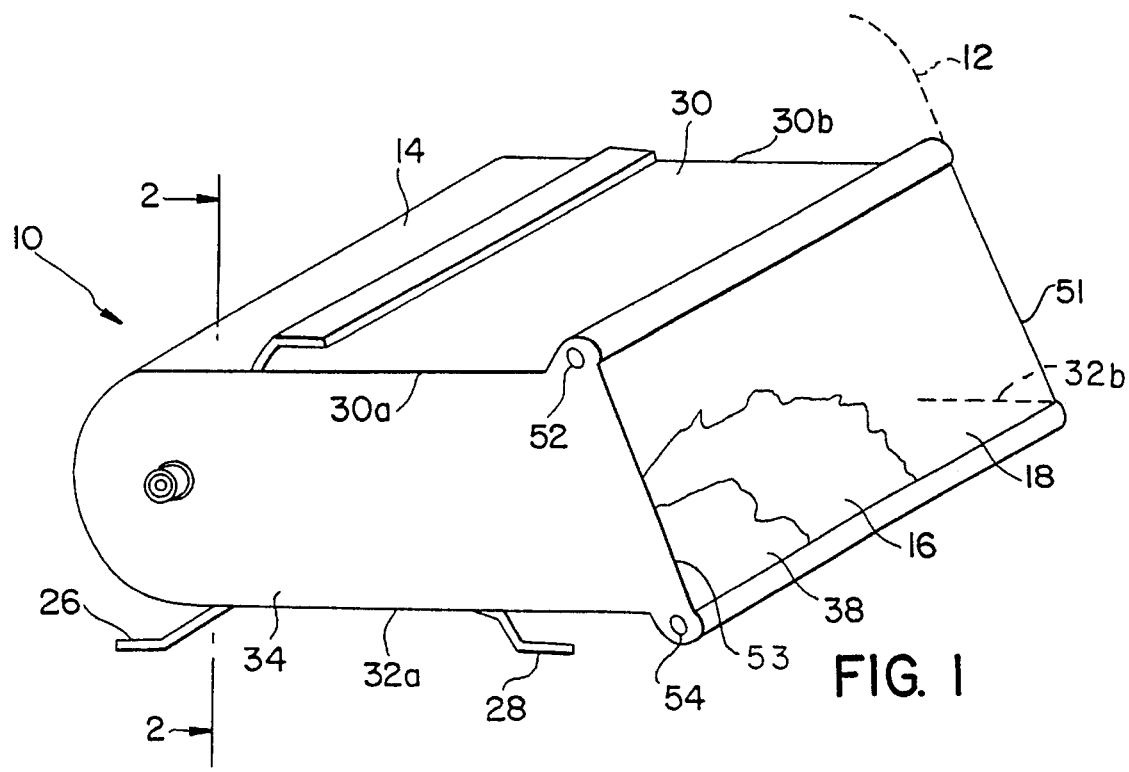
FIG. 1 is a perspective schematic illustration of the external profile of an integral reaction canister and diffuser tube having a diffuser portion and a cap portion for an air bag module according to one embodiment of the invention.

In FIG. 1 an air bag module 10 constructed according to one embodiment of the present invention is shown mounted in the instrument panel 12 of an automotive vehicle. For convenience of illustration the vehicle is not shown, the instrument panel 12 being indicated in phantom. The module 10 includes a reaction canister 14 which houses a folded air bag 16. A cover 18 for the air bag 16 is provided to prevent extraneous material from falling thereon and also into the reaction canister 14. The manner of attaching the cover forms no part of the present invention and, therefore, will not further be described herein.

Integrally formed with the reaction canister 14 is an elongated continuous circumference one piece diffuser tube 20. Axially spaced inflating gas exit ports or slots 22 are provided in the portion of the wall of the diffuser tube 20 that faces the air bag 16. Positioned within the diffuser tube 20 and rigidly held in a selected angular relation thereto, as further described hereinafter, is an inflator 24. Brackets 26 and 28 which are attached to the exterior of the reaction canister 14 are provided for facilitating the installation of the module 10 in the instrument panel 12. A decorative cover (not shown) which matches the profile of the surface of the instrument panel may be provided. When the module 10 is installed, such decorative cover forms part of the surface of the instrument panel.

The reaction canister 14 includes a top panel 30 and a bottom panel 32, each of which have a respective first edge 30a, 32a and a respective second edge 30b, 32b. The top panel 30 and bottom panel 32 in conjunction with the diffuser tube 20, a first end plate 34, and a second end plate 36 define a cavity 38. The air bag 16, folded in a conventional manner, is housed in cavity 38. In FIG. 1 the cover 18 has been partially broken away to reveal the folded air bag therein.

Figure 2:
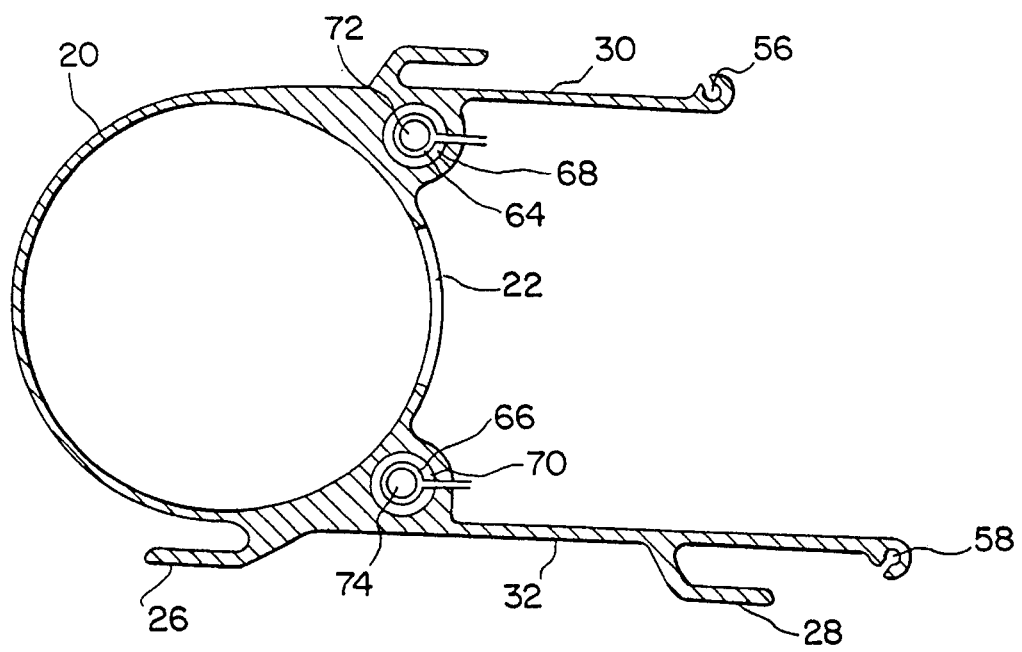
FIG. 2 is a sectional view taken along the lines 2—2 of FIG. 1 showing the continuous circumference one piece diffuser tube with integrally formed top and bottom panels of the reaction canister.
Figure 3:
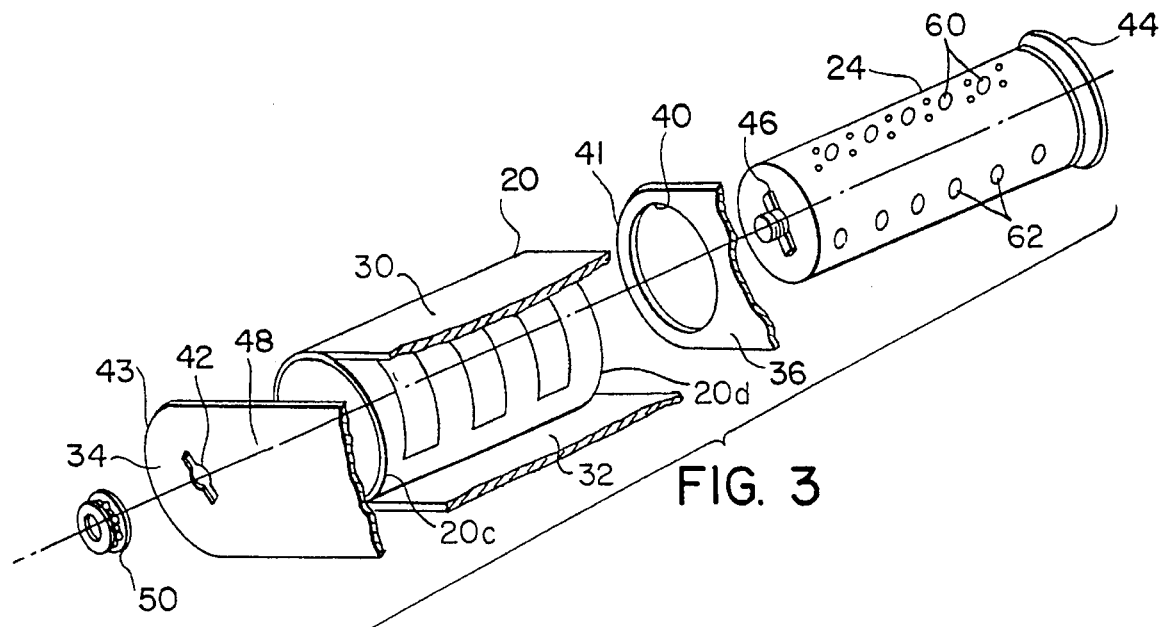
FIG. 3 is an exploded fragmentary view of the reaction canister of FIG. 1 illustrating the installation from the outside thereof of the inflator in the diffuser tube.

FIG. 2 shows a sectional view of the continuous circumference one piece diffuser tube 20 with the integrally formed top panel 30 and bottom panel 32 of the reaction canister 14. In other words, as shown, the diffuser 20 and the top panel 30 and the bottom panel 32 are formed as a continuous or unitary structure. By way of example and not limitation, it is noted that, in a preferred embodiment, this configuration can be produced in extruded aluminum. The slots 22 in the diffuser half of the diffuser tube 20, that half which faces the air bag 16 and the top panel 30 and the bottom panel 32, are located and sized so as to provide a desired distribution of gas into the air bag 16 of gas that is generated by the inflator 24. The inflator 24 has an elongated cylindrical configuration, as shown in FIG. 3, and is retained in the diffuser tube 20, in concentric relation therewith, between the end plates 34 and 36.

In order to allow the inflator 24 to be inserted in the diffuser tube 20 as a last operation in the assembly of the module 10, a circular opening 40 is provided in a first end 41 of the second end plate 36 and a smaller opening 42 with a key slot therein is provided in a first end 43 of the first end plate 34. Also, as shown, a flange 44 is provided on a first end of the inflator 24 and a threaded keyed stud 46 is provided on the second end thereof. The size of the opening 40 in the second end plate 36 is such as to allow the inflator 24 to be inserted in a snug fit from the second end thereof, that having the stud 46 thereon. Similarly, the size of the keyed opening 42 in the first end plate 34 is such as to snugly receive the stud 46. The arrangement is such that the relative angular positions of the inflator 24 and the diffuser tube 20 about the common longitudinal axis 48 thereof is determined by the keyed opening 42 in the first end plate 34 and the keyed inflator stud 46. A nut 50 on the stud 46 serves to hold the end plates 34 and 36 against first and second ends 20c and 20d, respectively, of the diffuser tube 20 with the inflator 24 captured therein.

The second end 51 of the end plate 36 and the second end 53 of the end plate 34, that is, the ends thereof adjacent the air bag cover 18, as seen in FIG. 1, are fixedly attached to the first and second edges, respectively, of the top panel 30 and the bottom panel 32 by drive screws 52 and 54. Screws 52 and 54 are screwed into grooves 56 and 58 that are provided at the respectively associated rearwardly located edges of the top panel 30 and bottom panel 32.

The internal structure of the inflator 24 forms no part of the present invention and may be any of a number of known constructions that are available commercially. By way of example and not limitation, the internal structure may comprise that disclosed in U.S. Pat. No. 4,890,860 granted to Fred E. Schneiter on Jan. 2, 1990 and assigned to the assignee of the present invention.

Figure 4:
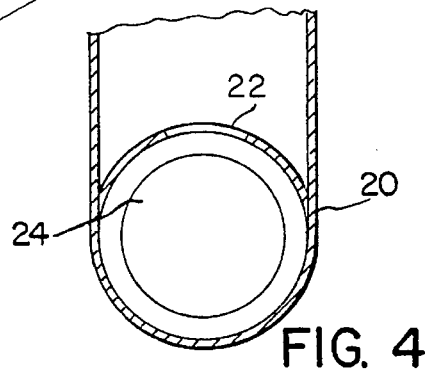
FIG. 4 is a schematic section view of the diffuser tube and inflator illustrating biasing of the jet flow of generated gases issuing from the diffuser slots.

As shown in FIG. 3, several longitudinal rows of axially spaced openings or exhaust ports 60 are provided on one side of inflator 24 parallel to the longitudinal axis 48 thereof and several substantially identical longitudinal rows of axially spaced exhaust ports 62 are provided on the other side thereof. The keying of the opening 42 in the first end plate 34 and of the inflator stud 46 is such as to cause the inflator rows of exhaust ports 60 and 62 to be selectively displaced angularly with respect to the diffuser slots 22 in the diffuser tube 20. This, as illustrated in FIG. 4, enables biasing of the jet flow of gases issuing from the slots 22. Selection of the degree of bias may readily be accomplished by appropriately angularly positioning, as by stamping, for example, of the keying slots in the first end plate 34 relatively to the keyed stud 46 on the end of the inflator 24.

Figure 5:
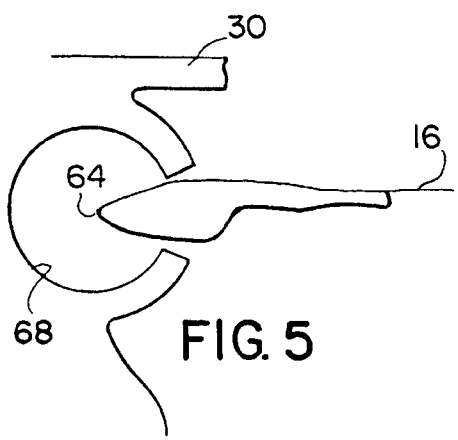
FIG. 5 is a fragmented detailed section view illustrating the manner of attachment of the air bag to the reaction canister.

For retaining the air bag 16 within the reaction canister 14, there is provided, as best seen in FIGS. 2 and 5, a pair of elongated key hole shaped slots or grooves 68 and 70 which are provided at the forward end of the cavity 38 in association, respectively, with the top panel 30 and the bottom panel 32. At each of the upper and lower sides of the generated gas inlet opening (not shown) of the air bag 16, the fabric is formed and sewn into a loop, specifically a loop 64 at the upper side and a loop 66 at the lower side, as shown in FIG. 2. Each of the loops 64 and 66 is inserted in a respectively associated elongated groove 68 and 70 that are formed at the forward ends of the upper and lower panels 30 and 32, respectively. Squeezing of the loops 64 and 66, as indicated in FIG. 5, is required to facilitate such insertion through a narrow entry way provided into each of the grooves 68 and 70. Retention of the loops 64 and 66 in the grooves 68 and 70, and thereby attachment of the air bag 16 to the reaction canister 14 and diffuser tube 20, is effected by the insertion of rods 72 and 74 through the loops 64 and 66, respectively, and thereby through the respectively associated grooves 68 and 70. The rods 72 and 74 may be fastened securely in fully inserted position in any suitable manner.

Figure 6:
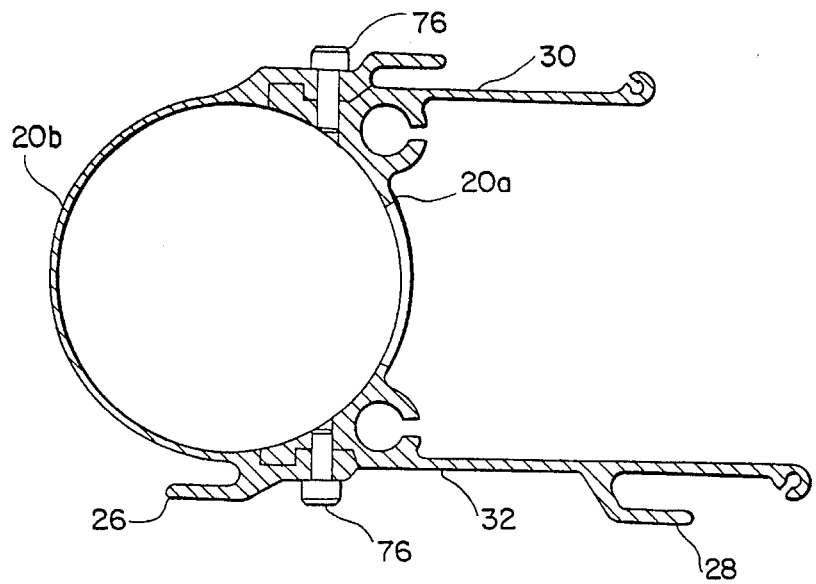
FIG. 6 is a sectional view similar to that of FIG. 2 illustrating a modification wherein the diffuser tube and the top and bottom panels of the reaction canister are formed in two pieces.

In FIG. 6 there is illustrated a modification of the continuous circumference diffuser and reaction canister arrangement shown in FIG. 2 wherein the diffuser tube and the top and bottom panels of the reaction canister are formed in two pieces instead of one. Thus, as shown in FIG. 6, one piece comprises the top panel 30 and the bottom panel 32 which are formed as a continuous unitary or integral structure with a portion only of the diffuser tube, specifically the "diffuser half," designated 20a. The other half of the diffuser tube, designated 20b and referred to herein as the "cap half," comprises the second piece.

In accordance with this embodiment of the invention, the two pieces are configured to interlock and join by dovetails. Assembly of the two pieces is by placing the two pieces in side-to-side relation and by sliding them relatively to each other over the entire length thereof. The two pieces may be rigidly retained in assembled relationship by one or more bolts 76 that extend from the cap half 20b into the diffuser half.

The two piece reaction canister and diffuser tube arrangement of FIG. 6, similar to the one piece configuration of FIG. 2, features a diffuser tube of continuous circumference and involves the attendant advantages of this type of diffuser, as described hereinbefore.

While not shown in FIG. 6, the structure for the attachment of the air bag 16 to the reaction canister and diffuser tube may be as illustrated and described in connection with FIGS. 2 and 5.

Figure 7:
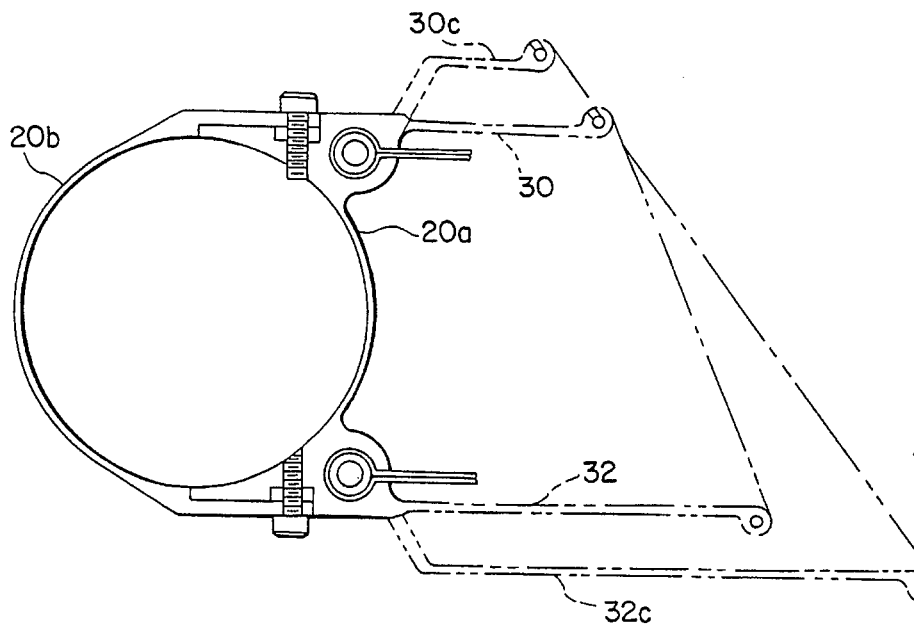
FIG. 7 is a sectional view similar to FIG. 6 illustrating different configurations for the top and bottom panels of the reaction canister for facilitating the use thereof with differently characterized vehicle instrument panels.

FIG. 7 is a section that is similar to that of FIG. 6 and illustrates different configurations for the top panel 30 and the bottom panel 32 of the reaction canister 14 for enabling the use thereof with instrument panels having different profiles. Thus, different spacings may be provided between the top panel 30 and the bottom panel 32, and different depths may also be provided, as illustrated by top panel 30c and bottom panel 32c.

Figure 8:
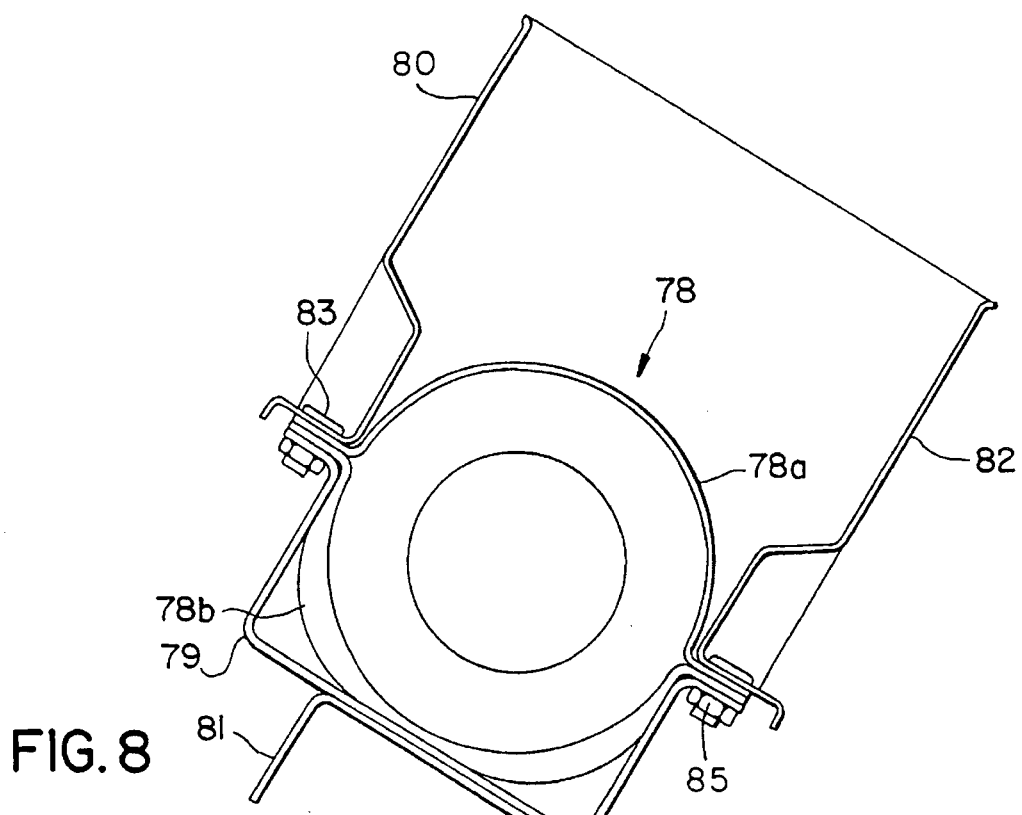
FIG. 8 is a sectional view illustrating a diffuser tube of the clamshell type in a narrow mouth width and deep top and bottom panel reaction canister.

FIG. 8 is a schematic sectional view illustrating a diffuser tube 78 of the clamshell type in a narrow mouth width and deep top and bottom panel reaction canister. The clamshell diffuser 78 may be made of aluminum or steel. It includes a diffuser half 78a and a cap half 78b which include mating flanges that extend from each side of the halves for the attachment of the two halves to each other. While the diffuser half 78a and cap half 78b may be generally equal in construction, the cap half 78b, in FIG. 8, is shown as being made of heavier gage material for increased strength. Associated with the diffuser tube 78 and attached thereto by means of the mating flanges are a top panel 80 and a bottom panel 82 of a reaction canister and also instrument panel mounting brackets 79 and 81. The several components are securely and rigidly attached to each other by fasteners comprising studs 83 and nuts 85, which studs 83 extend through the slot in flanges of diffuser half 78a and cap half 78b and also through cooperatively positioned flanges that are provided on the top and bottom reaction canister panels 80 and 82, respectively, and also on the bracket 79. For adding strength to the configuration the cap half 78b of the diffuser 78 may be made of heavier gage material, as shown in FIG. 8, than the diffuser half 78a.

Figures 9, 10:
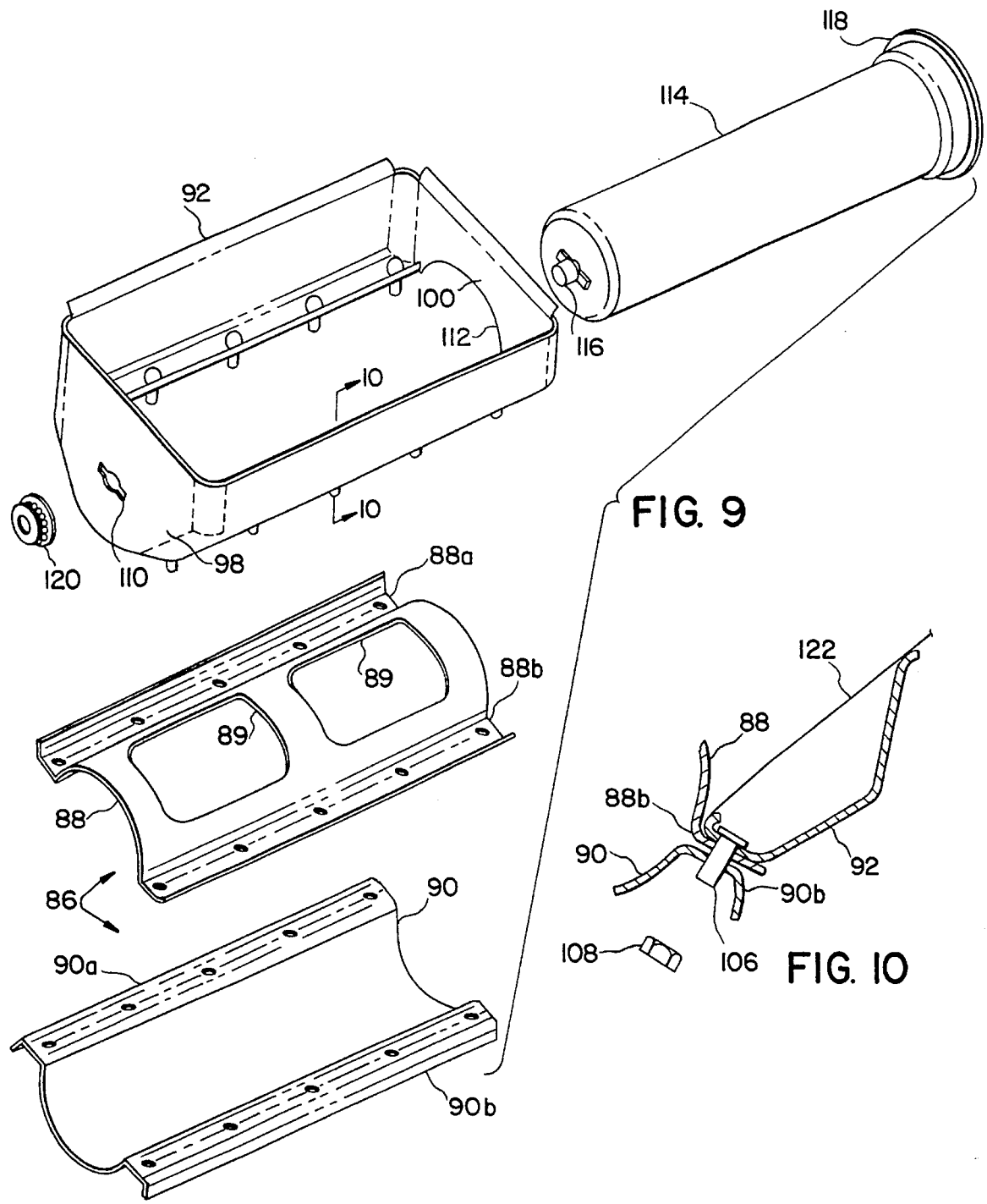
FIG. 9 is an exploded perspective view illustrating a clamshell diffuser tube in a wide mouth width and shallow top and bottom panel reaction canister.
FIG. 10 is a fragmentary sectional view taken along the lines 10—10 of FIG. 9 showing in detail the air bag attachment and fastening arrangement that may be employed in the reaction canister of FIG. 9.

An exploded perspective view of clamshell diffuser tube in a wide mouth width and shallow top and bottom panel reaction canister is illustrated in FIG. 9. The clamshell diffuser tube, designated 86, includes a diffuser half 88 having slots 89 therein, and a cap half 90. Flanges 88*a* and 88*b* on the opposite sides of diffuser half 88 are arranged to mate with flanges 90*a* and 90*b* that are provided on the opposite sides of the cap half 90, as best seen in the sectional view of FIG. 11.

The reaction canister, indicated at 92 includes a top panel 94, a bottom panel 96, a first end plate 98 and a second end plate 100. These components, in a preferred embodiment, are fabricated in a one piece configuration, and may be formed from aluminum sheet 0.080 inches thick. The clamshell diffuser 86 may be made of the same material.

Figure 11:
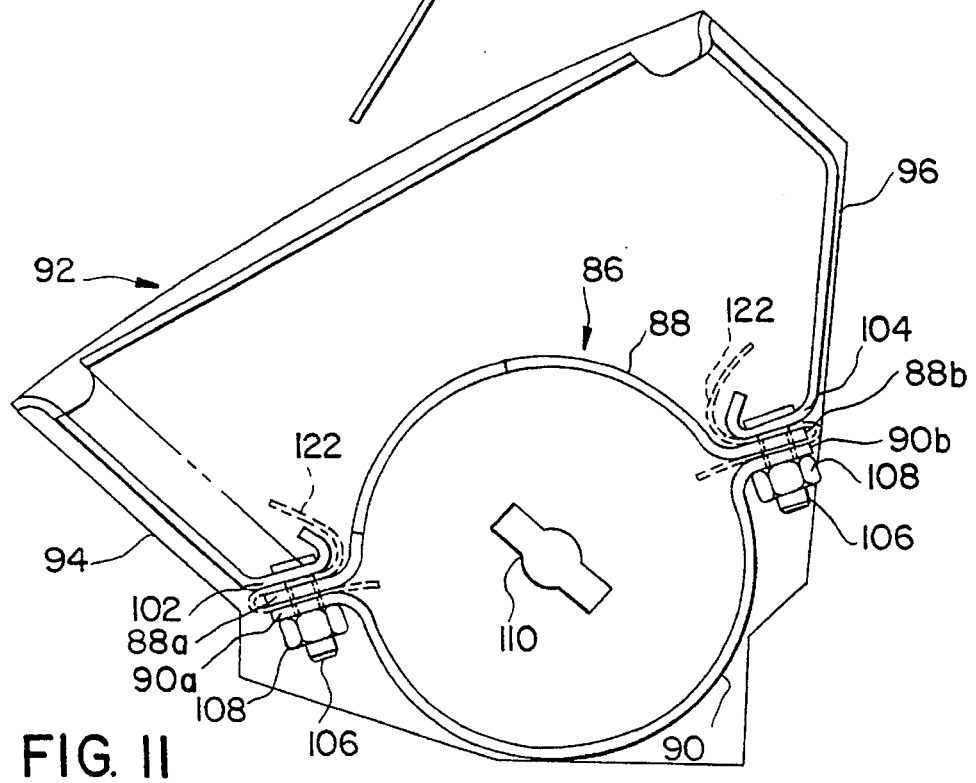
FIG. 11 is a sectional view illustrating the assembled clamshell diffuser and reaction canister arrangement of FIG. 9.

As best seen in FIG. 11, the top panel 94 of the reaction canister 92 includes a flange 102. The bottom panel 96 includes a flange 104. The arrangement is such that, when the reaction canister 92 and the diffuser 86 are in assembled relation, the flange 102 of the top panel 94, the flange 88*a* of the diffuser half 88 and the flange 90*a* of the cap half 90 are superposed on one another, as are, also, the flange 104 of the bottom panel 96, the flange 88*b* of the diffuser half 88 and the flange 90*b* of the cap half 90. The reaction canister 92 and the diffuser tube 86 are retained in assembled relation by a plurality of studs 106 that, as shown, extend through aligned, spaced apart holes in the superposed flanges, the studs 106 being retained in the holes by nuts 108 tightened thereon.

As best seen in FIG. 9, a hole or opening 110 with a key slot therein is provided in the first end plate 98 of the reaction canister 92, and a substantially half circle portion 112 is cut out of the second end plate 100. The radius of curvature of the cut out portion 112 is somewhat smaller than that of the diffuser half 88, but is such, with the diffuser tube 86 and the reaction canister 92 in assembled relation, as to allow an inflator 114 to be inserted into the diffuser 86 in snug relation therewith.

The internal structure of the inflator 114 may be identical to that of the inflator 24 described hereinbefore, and similarly thereto, includes a keyed stud 116 at one end and a flange 118 at the other end. The stud 116 is arranged to extend through the keyed opening 110 in the first end plate 98 with the flange 118 at the other end of the inflator 114 engaging the outer surface of the second end plate 100 and the adjacent end of the diffuser cap half 90. To that end, the flanges 90*a* and 90*b* at that end of the end cap 90 are notched to allow the cap half 90 to extend toward the inflator flange 118 by an amount substantially equal to the thickness of the second end plate 100. A nut 120 is applied to stud 116 and tightened to hold the inflator rigidly within the diffuser 86 in concentric relation therewith.

The inflator 114 may be similar in internal structure to the inflator 24 previously described and includes several longitudinal rows of exhaust ports (not shown) on opposite sides. As in the invention embodiment illustrated by reference to FIG. 4, bias of the flow of generated gas out of the exhaust ports may be selected, as desired, by appropriate angular placement of the key slot in the first end plate 98 of the reaction canister 92.

The attachment and fastening of an air bag 122 to the reaction canister 92 and the diffuser tube 86 are illustrated in FIGS. 10 and 11. As shown, the fabric of the air bag 122 at the gas inlet opening is folded around each of the opposed flanges 88*a* and 88*b* of the diffuser half 88 of the diffuser tube 86 and captured between the respectively associated flanges 90*a*, 88*a*, 102 and 90*b*, 88*b*, 104. Studs 106 extend through holes in the fabric that are in alignment with the spaced apart holes provided in the several flanges. The application of and tightening of nuts 108 on the studs 106 secures the air bag 122 to the reaction canister 92 with the inlet opening (not shown) thereof positioned in operative relation with the generated gas exit slots 89 in the diffuser half 88 of the diffuser tube 86.

Figure 16:
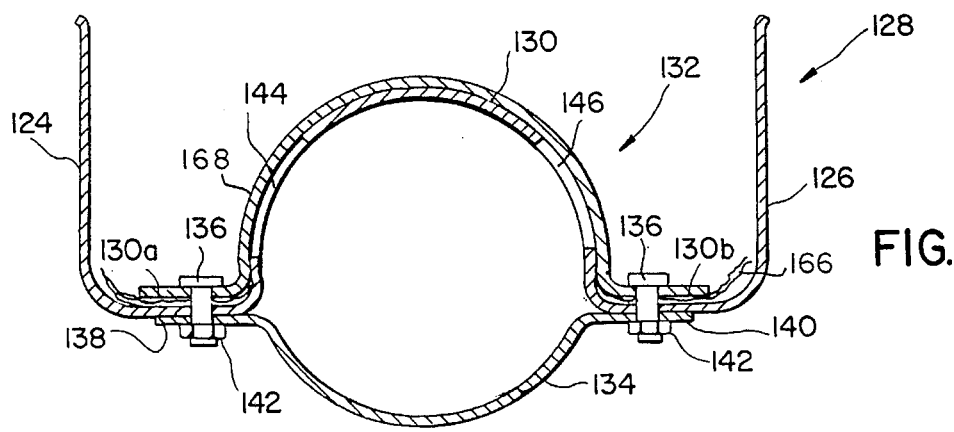
FIG. 16 is a section taken on the lines 16—16 of FIG. 14 showing the reaction canister body and the diffuser half of the diffuser tube formed in one piece.
Figure 17:
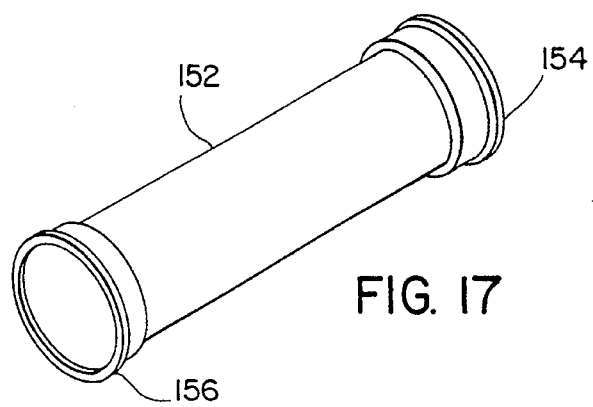
FIG. 17 is a view showing an inflator having a flange at both ends and adapted for use in the wide mouth clamshell reaction canister of FIGS. 12–16.

FIG. 12 illustrates, in a perspective view, the envelope configuration of a diffuser tube cap with a wide mouth clamshell reaction canister wherein the length of the reaction canister is greater than the length of the inflator. FIGS. 13, 14 and 15 show top plan, side and end views, respectively, of the reaction canister. FIG. 16 is a section taken on the lines 16—16 of FIG. 14 showing the reaction canister and the diffuser half of the diffuser tube formed in one piece. FIG. 17 is a view of the inflator employed in this embodiment of the invention.

As shown in FIG. 16, the top panel 124 and the bottom panel 126 of the clamshell reaction canister, designated 128, are integrally formed with the diffuser half 130 of a diffuser tube 132. A cap half 134 of the diffuser tube 132 is attached to the diffuser half 130 by a plurality of spaced apart studs 136 that extend downwardly from the reaction canister 128 through holes therein in flange-like portions 130*a* and 130*b* formed adjacent both sides of the diffuser half 130 and through holes in alignment therewith in opposed flanges 138 and 140 that are provided on the cap half 134. Nuts 142 applied to the studs 136 retain the cap half 134 firmly secured to the reaction canister 128 and the diffuser half 130.

The diffuser tube 132, as disclosed in FIGS. 12–16, differs from the diffuser tubes previously described herein in respect of the provision of spaced apart slots on both sides thereof, specifically three slots 144 facing the top panel 124 and three similar slots 146 facing the bottom panel 126. All of the slots 144 and 146 are angularly displaced from the horizontal plane of the diffuser tube 132, as seen in FIG. 16, by an angle of about 30°.

In addition to the one piece configuration of the diffuser half, top panel 124 and bottom panel 126, the reaction canister 128 includes a first end plate 148 and a second end plate 150. The ends of the end plates 148 and 150 may be joined to the respectively associated ends of the top and bottom panels 124 and 126 in any suitable manner, as for example, by welding.

As shown in FIG. 17, the inflator 152 employed in this embodiment of the invention is elongated, although of length shorter than the length of the reaction canister 128. The internal structure of the inflator 152 may be similar or identical to the inflator 24 previously described herein, but externally differs therefrom in the provision of a mounting flange at both ends, specifically a flange 154 at the right end and a flange 156 at the left end.

For enabling the insertion of the inflator 152 into the diffuser tube 132 from outside of the reaction canister 128, a circular cut out 158 is provided in the second end plate 150. For facilitating the retention of the inflator 152 in the diffuser tube 132 spaced slots 160 and 162 are cut out in the diffuser half 130 of the diffuser tube 132, with the spacing of the slots corresponding to the distance between the inflator flanges 154 and 156. Slot 160, as best seen in FIG. 13, is positioned adjacent the first end plate 148 and the slot 162 is positioned adjacent the second end plate 150. The width of each of the slots 160 and 162 correspond to the widths of the flanges 154 and 156 of the inflator 152. Installation of the inflator 152 in the diffuser tube 132 thus merely involves inserting or dropping the inflator 152 therein, whereupon the inflator flanges 154 and 156 engage individually associated ones of the spaced inflator retention slots 160 and 162 in the diffuser half 130.

As shown in FIGS. 12 and 13, a plurality of holes 164 may be provided in the top of the diffuser half, providing exit passages from the diffuser tube 132 in addition to the opposed sets of slots 144 and 146. Generated gas flowing out of the holes 164 from the diffuser tube 132 flow directly into the associated air bag and serves to relieve the pressure somewhat in the diffuser tube 132.

Figure 18:
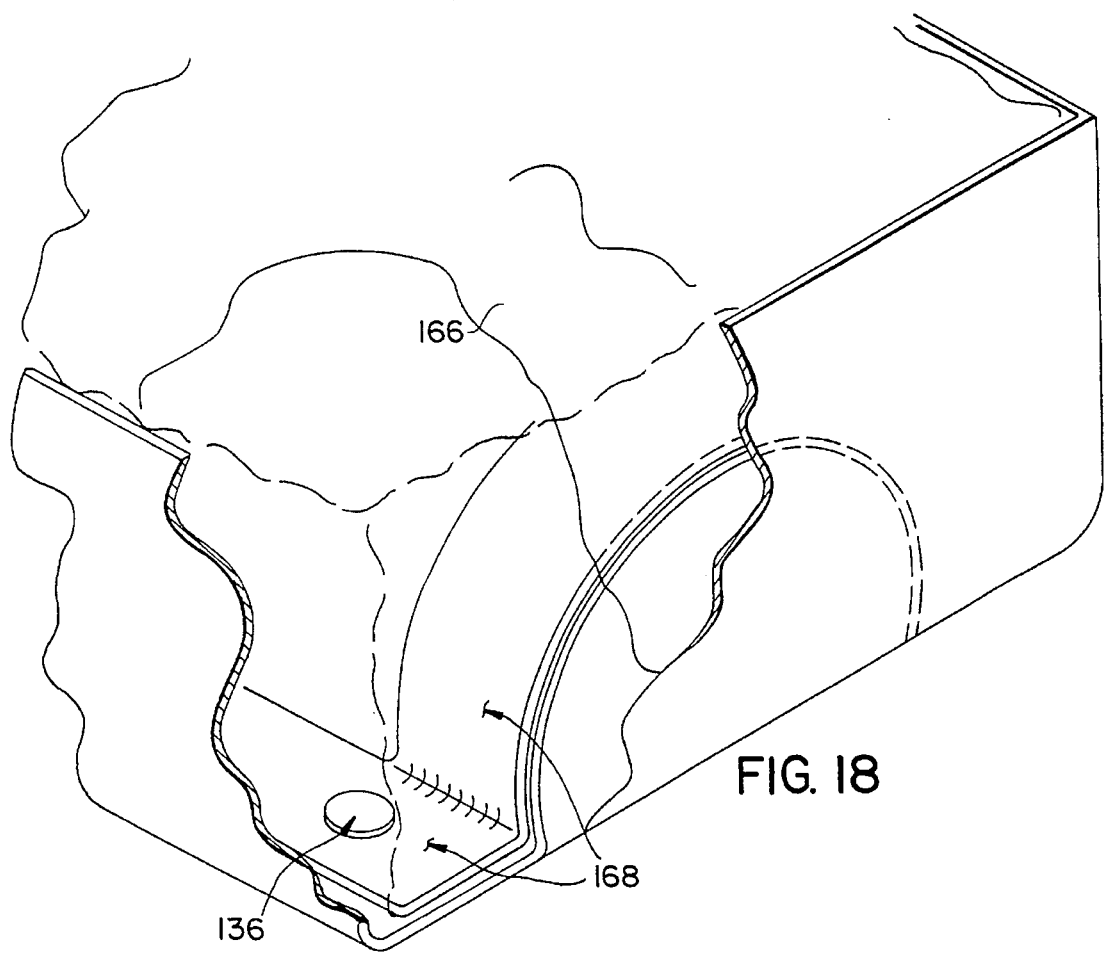
FIG. 18 is a fragmented perspective view on a larger scale illustrating the attachment of an air bag to the wide mouth clamshell reaction canister of FIG. 12.
Figures 19A, 19B:
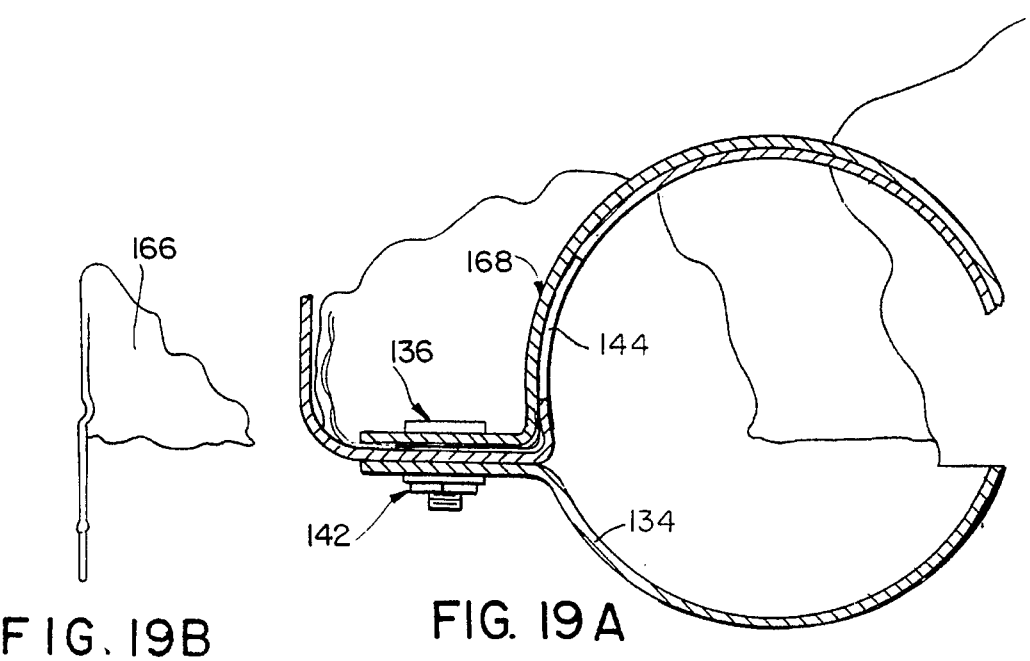
FIGS. 19A and 19B are sections taken along the lines 19—19 of FIG. 12 showing the air bag retained to the wide mouth clamshell reaction canister by an air bag retainer.

In effecting the attachment of an air bag 166 to the wide mouth clamshell reaction canister 128, as best seen in FIGS. 18 and 19, the mouth of the air bag 166 is sewn into a rectangle with a double thickness of material tab extending down along each side. These tabs have holes burnt into them that are folded under and over the studs 136 in a bag retainer 168. With the air bag tabs over the studs 136 on both sides of the bag retainer 168, the assembly is assembled in the chute with the studs 136 passing through the holes in the chute. The inflator 152 is then installed from the back side with the cap flanges 138 and 140 and nuts 142 installed.

FIG. 20 is an exploded view illustrating the use of the clamshell feature in a soft pack installation. The soft pack is intended for use where the reaction canister is built into the instrument panel by the automobile manufacturer. As shown, the soft pack contains an inflator 170, a folded air bag 172, a diffuser tube 174 having a cap half 176 and a diffuser half 178 with studs 180 for mounting in the instrument panel (not shown). A curved flange 177 is provided at one end of the diffuser half 178 of the diffuser tube 174 and a similar curved flange 179 is provided at the other end thereof.

The internal structure of the inflator 170 may be identical to that of the inflator 24 previously described herein and includes a flange 182 at one end and a keyed stud 184 at the other end. A keyed circular retaining plate 186 and nut 188 are provided for retaining the inflator concentrically within the diffuser tube 174 when inserted therein upon assembly of the soft pack. For predetermining the relative angular positions of sets of exhaust ports 190 in the inflator 170 and exit slots 192 of the diffuser half 178, the keyed retaining plate 186 is provided with a pin-like projection 194 on the circumference thereof and the diffuser half 178 is provided with a cooperating mating slot 196 on the adjacent edge thereof.

The fragmented view of FIG. 21 illustrates the installation of the folded air bag 172 in the soft pack of FIG. 20 and shows an edge of the generated gas inlet opening (not shown) of the air bag 172 as crimped between folded portions of the flanges 200 of the cap half 176 of the diffuser tube 174. This air bag retention technique allows for the use of fewer studs or other fasteners.

Figure 22:
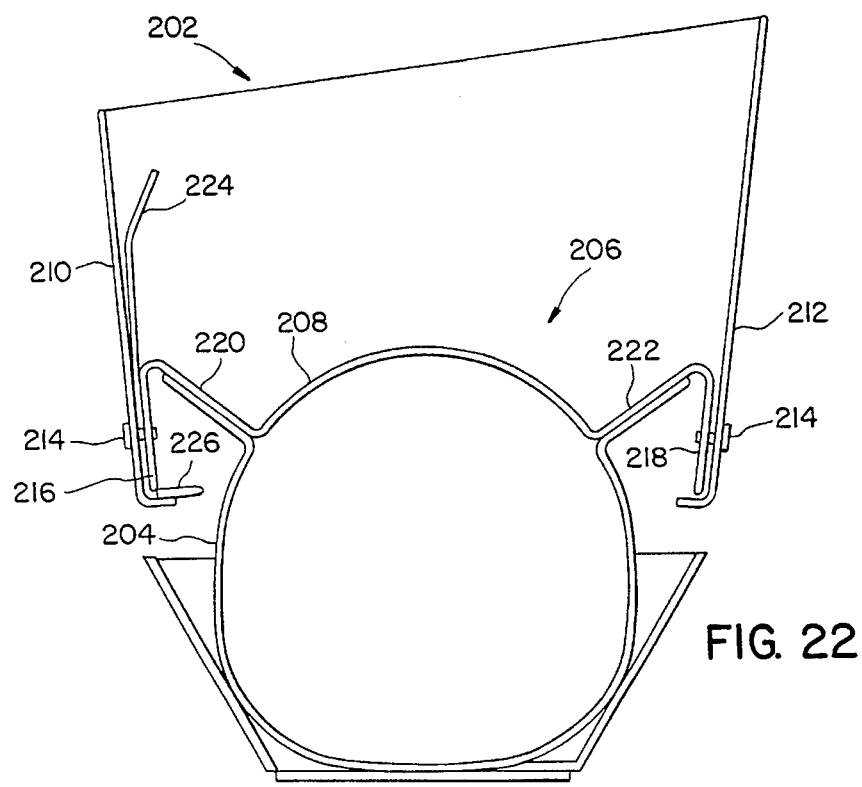
FIG. 22 is a schematic section of a fabricated modified clamshell reaction canister.

In the modified clamshell reaction canister 202 illustrated in FIG. 22, a lower or cap portion 204 of a diffuser tube 206 is enlarged, as shown, to provide more area for end porting hybrid inflator gas passage to the center of the reaction canister 202. The two halves of the diffuser tube 206, that is, the cap portion 204 and a diffuser portion 208, may be spot welded together thereby to provide radial continuity for strength. The reaction canister 202, as shown, also is provided with a top panel 210 and a bottom panel 212. Each of panels 210 and 212 is attached by screws 214 to an individually associated one of opposed forwardly extending flange portions 216 and 218 of the diffuser portion 208 of the diffuser tube 206. Forwardly extending flange portions 216 and 218 are integrally formed with respectively associated rearwardly extending flange portions 220 and 222, as shown.

For the attachment of an air bag 224 to the reaction canister 202, the air bag gas inlet or mouth is sewn into a rectangle with a double thickness of material tab down each side and a forward extension that is sewn into a pocket 226. These pockets 226 are slipped over the forwardly extending flange extensions 216 and 218 of the diffuser portion 208. The bag 224 and diffuser portion 208 is then installed into the chute and fastened with screws 214 through the air bag 224 and the diffuser flanges 216 and 218.

Figure 23:
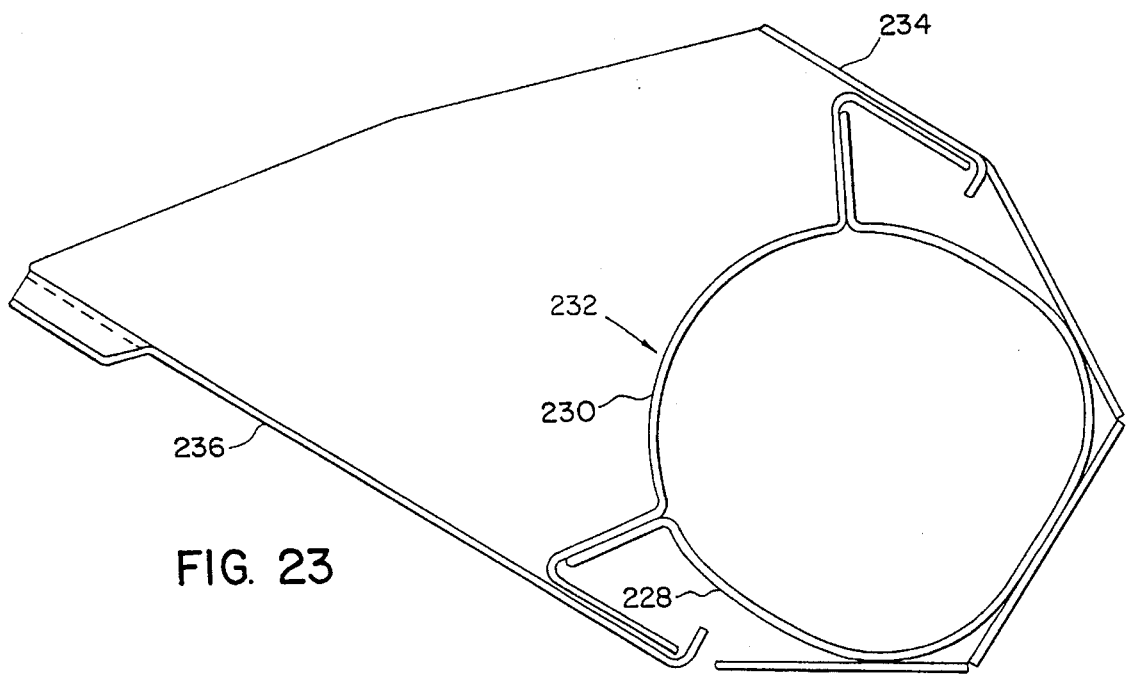
FIG. 23 is a schematic section of another modified clamshell arrangement that is similar to that of FIG. 22.

A modified clamshell reaction canister arrangement that is similar to that shown in FIG. 22 is shown in FIG. 23. Again, the two halves, a lower or cap portion 228 and a diffuser portion 230 of a diffuser tube 232, are welded together for radial continuity. The lower or cap portion 228 is enlarged similarly to the cap portion 204 of FIG. 22 for hybrid installation. In the arrangement of FIG. 23, however, the diffuser portion 230 of the diffuser tube 232 is made of a heavier gage material to provide a strong member across top and bottom panels 234 and 236, respectively, thereby effectively to shorten their length, whereby a reduction in the tendency to bell mouth is achieved.

The attachment of an air bag (not shown) may be made to the modified clamshell arrangement of FIG. 23 in the same manner as that employed in FIG. 22.

Figure 24:
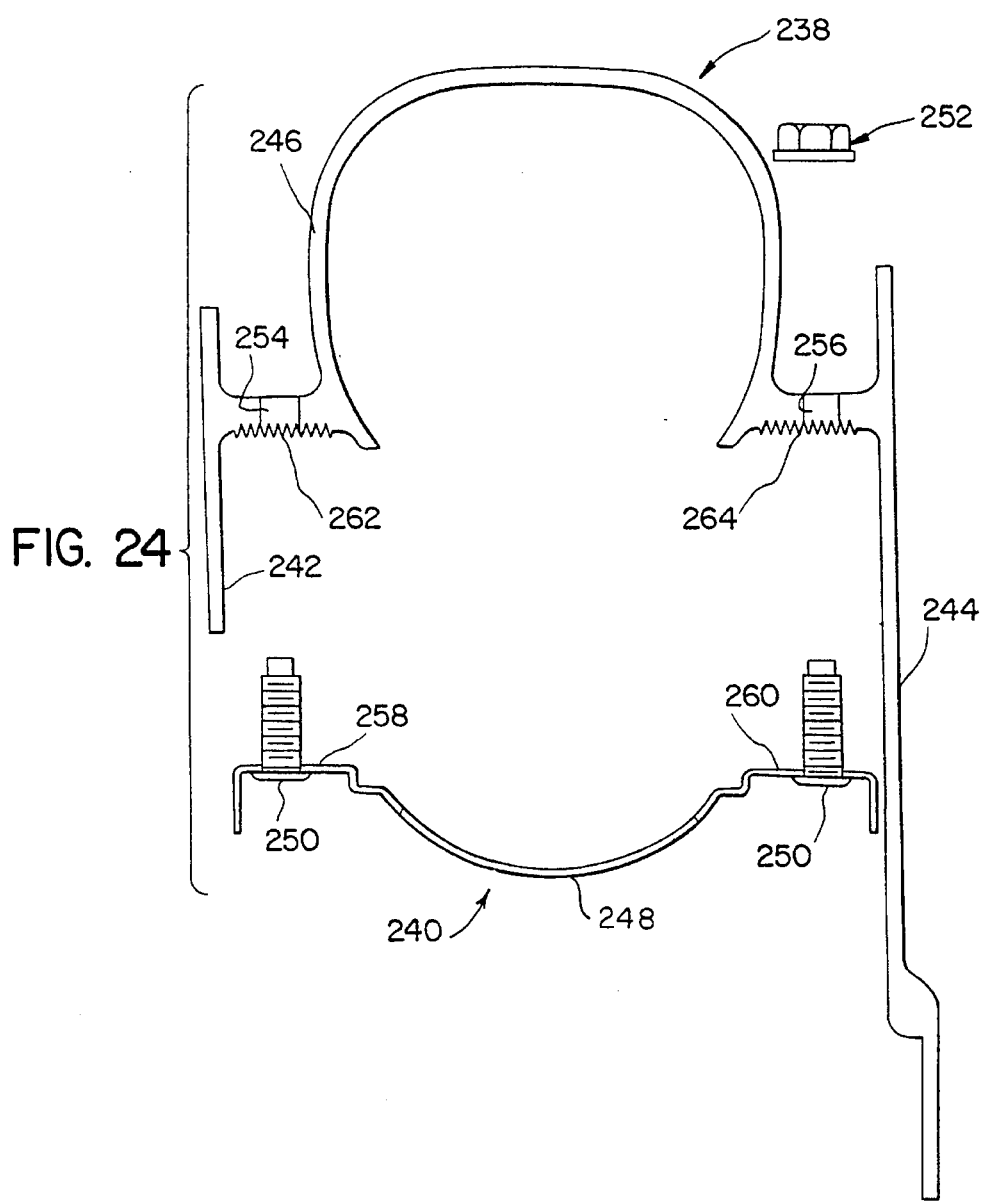
FIG. 24 is an exploded view illustrating an extruded section modified clamshell reaction canister wherein the configuration involving the diffuser and the top and bottom panels is formed in two pieces.

FIG. 24 is an exploded view illustrating an extruded section modified clamshell reaction canister 238 wherein the configuration of the diffuser 240 and the top and bottom panels 242 and 244, respectively, is formed in two pieces. Specifically, as shown, a cap portion 246 of the diffuser 240 and the top panel 242 and the bottom panel 244 are extruded as a single piece, and a diffuser portion is fabricated as a separate piece. Screws 250 and nuts 252 are provided for fastening the two pieces together and retaining them in securely assembled relation and for the attachment of an air bag (not shown) between opposed flanges 254, 256 on the cap portion 246 and opposed flanges 258 and 260 on the diffuser portion 248. For improving the retentive capability of such air bag attachment technique, the opposed flanges 254 and 256 on the cap portion 246 may be provided with serrated surfaces 262 and 264, respectively, as shown, during the extrusion process.

Thus, in accordance with the invention, there has been provided an improved reaction canister assembly enabling:

(a) a simpler installation of the inflator from outside the reaction canister thereby making possible the installation of the inflator as a last operation of assembly;

(b) the inflating gases generated by the inflator to be contained at a lower pressure;

(c) an efficacious method of sealing the inflator against leakage into the passenger compartment; and (d) the use of a thrust neutral inflator for safety while still retaining the advantage of being able to direct a gas flow that can be biased for best bag deployment.

Briefly summarizing, these and other advantages, as described herein, have been achieved by the use of a reaction canister including a diffuser tube integral therewith for housing and positioning an inflator and an inflatable bag and for directing an inflating gas jet produced by the inflator for inflating the bag. In one embodiment, the diffuser is a continuous circumference one piece diffuser. In another embodiment, the diffuser is a continuous circumference two piece diffuser. In still other embodiments, the diffuser is of a clamshell type having two halves that generally are equal in configuration with mating flanges that extend from each side of each half. A diffuser of a modified clamshell type is also contemplated wherein the flanges are moved forward thereby effectively reducing the depth of the top panel and the bottom panel of the reaction canister and concomitantly reducing the tendency to bell mouth.

What is claimed is:

1. An air bag module comprising:

an extruded reaction canister, said reaction canister including a diffuser tube and extending sides, characterized in that said diffuser tube is formed in one piece with said extending sides, said diffuser tube including a portion situated at a designated position along each side integrally extending between the sides, the sides and the diffuser tube forming an open ended receptacle capable of receiving an inflator to inflate an associated air bag; each side, at a rearwardly located edge thereof, includes a first slot, said reaction canister further includes a second slot located generally at the juncture of said diffuser portion and each side, an inflatable air bag, said air bag including a generated gas inlet opening having a looped portion of air bag material formed at opposite sides thereof, a rod fitted into each looped portion, each rod and associated looped portion are positioned in one of the corresponding second slots, the remaining portions of the air bag being positioned in the space between said sides and said diffuser portion, and a cover for said reaction canister, said cover being positioned adjacent said first slots that are provided at the rearwardly located edges of said reaction canister sides.

2. The apparatus as defined in claim 1, wherein said reaction canister includes end plates which enclose said receptacle, join ends of each of the reaction canister sides, and support an inflator.

3. The apparatus, as defined in claim 2, and wherein, in order to allow said inflator to be inserted in said open ended receptacle as a last operation in the assembly of said air bag module, a flange is provided on a first end of said inflator and a threaded fastener is provided on the second end thereof, a circular opening is provided in one of said end plates and a smaller opening is provided in the other of said end plates, the size of the circular opening in said one end plate being such as to allow said inflator to be inserted in a snug fit from the second end thereof, and the size of the opening in said other end plate is such as to snugly receive said threaded fastener of said inflator.

4. An air bag module comprising:

an extruded reaction canister including a top panel and a bottom panel and a diffuser tube having a diffuser portion and a cap portion and situated at a designated position along each of said top panel and said bottom panel, said top and bottom panels each having an edge that is rearwardly located with respect to said diffuser tube, with said diffuser portion and said cap portion forming an open ended receptacle that is capable of receiving an inflator to inflate an associated air bag and characterized in that said diffuser portion and said cap portion are formed in one piece with said top panel and said bottom panel of said reaction canister, each said top panel and said bottom panel includes a first slot that is provided at the rearwardly located edge of said top panel and said bottom panel, said reaction canister further includes a second slot located generally at the juncture of said diffuser portion and each said top panel and said bottom panel, an inflatable air bag, said air bag including a generated gas inlet opening having a looped portion of air bag material formed at opposite sides thereof, a rod fitted into each looped portion, each rod and associated looped portion are positioned in one of the corresponding said second slots, the remaining portions of said air bag being positioned in the space defined by said top panel and said bottom panel and said diffuser portion, and a cover for said reaction canister, said cover being positioned adjacent to said first slots that are provided at the rearwardly located edges of said top panel and said bottom panel.

5. The apparatus, as defined in claim 4, wherein said reaction canister includes end plates that are attached to the edges of the top panel and the bottom panel, which end plates enclose the open ended receptacle formed in said diffuser tube by said diffuser portion and said cap portion, and support an inflator.

6. The apparatus, as defined in claim 5, further including an inflator, wherein a flange is provided on a first end of said inflator and a threaded fastener is provided on the second end thereof, a circular opening is provided in one of said end plates and a smaller opening is provided in the other of said end plates, the size of the opening in said one end plate being such as to allow said inflator to be inserted in snug fit from the second end thereof, and the size of the opening in said other end plate is such as to snugly receive said threaded fastener of said inflator, whereby said inflator may be inserted in said open ended receptacle as a last operation of assembly of said air bag module.

7. An air bag module comprising:

an inflator and an extruded reaction canister and diffuser for a motor vehicle inflatable restraint system characterized in that said reaction canister has a cover, a top panel and a bottom panel, and said diffuser comprises a diffuser tube having a diffuser portion and a cap portion and characterized in that said diffuser and cap portions are formed in one piece with said top panel and said bottom panel of said reaction canister and form an open ended receptacle in which said inflator is positioned to inflate an associated air bag, and further characterized in that said top panel and said bottom panel extend in one piece to said cover from said diffuser and cap portions of said diffuser tube, and said reaction canister further includes air bag attachment slots located generally at the juncture of said diffuser portion and each said top panel and said bottom panel, and an inflatable air bag, said air bag including a generated gas inlet opening having a looped portion of air bag material formed at opposite sides thereof, a rod fitted into each looped portion, each rod and associated looped portion are positioned in one of said air bag attachment slots, the remaining portions of said air bag being positioned between said top panel and said bottom panel and between said diffuser and said cover.

8. An air bag module, as defined in claim 7, wherein said reaction canister further includes end plates which enclose said receptacle, join ends of each of said top panel and of said bottom panel and support said inflator.

9. An air bag module, as defined by claim 7, wherein said inflator has an elongated cylindrical shape and includes a gas flow outlet arrangement that renders said inflator substantially thrust neutral.

* * * * *